United States Patent [19]
Nevett

[11] 3,772,941
[45] Nov. 20, 1973

[54] GEAR SELECTION MECHANISMS FOR VEHICLES

[75] Inventor: Leslie James Nevett, Clitheroe, England

[73] Assignee: Joseph Lucas (Industries) Limited, Birmingham, England

[22] Filed: Feb. 10, 1972

[21] Appl. No.: 225,136

[30] Foreign Application Priority Data
Feb. 15, 1971 Great Britain ................ 4,622/71

[52] U.S. Cl. .................... 74/850, 74/477, 74/529
[51] Int. Cl. .................... B60k 21/00, G05g 5/10
[58] Field of Search ............ 74/850, 477, 503, 74/529

[56] References Cited
UNITED STATES PATENTS

| | | | |
|---|---|---|---|
| 3,540,313 | 11/1970 | Maurice et al. | 74/850 |
| 3,613,482 | 10/1971 | Benson, Jr. et al. | 74/850 |
| 2,798,468 | 7/1957 | Heidner | 123/98 |
| 2,925,076 | 2/1960 | Jensen et al. | 74/850 X |
| 3,534,637 | 10/1970 | Tomlinson | 74/850 |
| 3,587,351 | 6/1971 | Keller et al. | 74/850 |

*Primary Examiner*—Arthur T. McKeon
*Attorney*—John C. Holman et al.

[57] ABSTRACT

A gear selection mechanism for a vehicle, including a link member arranged at one end to be coupled to the gear selection lever and arranged at its other end to be coupled to the gear box. The link member normally transmits the movement of the lever to the gear box to operate the gear box, and the link member is provided with first and second parts which are capable of movement relative to one another. The mechanism further includes a locking member selectively operable by the driver of the vehicle to either lock the two parts of the link member relative to one another so that the link member acts as a solid component, and transmits the movement of the operating lever to the gear box, or alternatively releases the two parts of the link member so that they can move relative to one another in which situation the link member does not transmit the movement of the lever to the gear box.

5 Claims, 1 Drawing Figure

PATENTED NOV 20 1973　　3,772,941
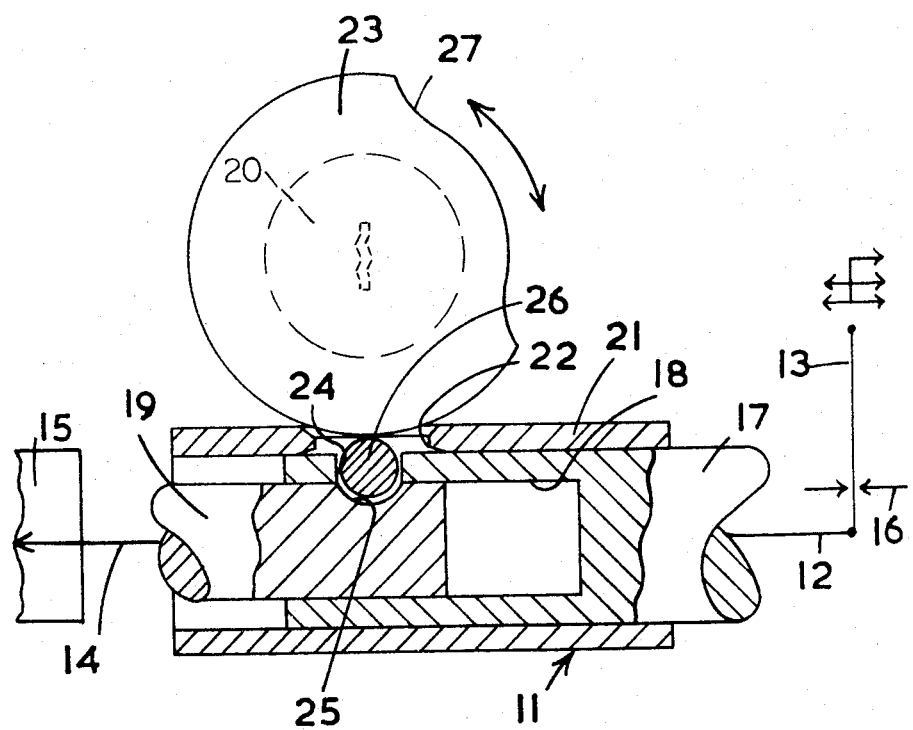

GEAR SELECTION MECHANISMS FOR VEHICLES

This invention relates to gear selection mechanisms for vehicles.

A mechanism in accordance with the invention includes a link member arranged to be coupled at one end to a gear selector lever of the vehicle and arranged to be coupled at its other end to a gear box of the vehicle so that the link member in use tranmsits movements of the lever to the gearbox to operate the gearbox, the link member including first and second parts capable of movement relative to one another and the mechanism further including a locking device selectively operable either to interconnect said first and second parts so that the link member is capable of transmitting said movement, or to release the first and second parts of the link member for relative movement so that the link member does not transmit the movement of the lever to the gearbox.

Preferably the locking device is manually operable from within the driving compartment of the vehicle and includes a key operated arrangement whereby the locking device can only be operated by a predetermined key.

Desirably the key operated arrangement includes an electrical switch which is also operable only by said key and which controls starting of an engine of the vehicle.

Conveniently the switch is an ignition control switch.

In the preferred form the locking device includes a locking member, preferably a ball, which is urged by a rotatable cam to a position wherein it extends through an aperture in a sleeve integral with said first part of the link member, into engagement with the wall of a recess in a portion of the second part of the link member which is slidably received in said sleeve, to lock the first part to the second part, the cam having a recessed region which when aligned with said locking member permits the locking member to become disengaged from the recess in the second part so that the first and second parts are released for relative movement.

The accompanying drawing is a partly diagrammatic sectional view of a road vehicle gear selection mechanism, illustrating one example of the invention.

Referring to the drawings, the gear selection mechanism includes a link member 11 arranged to be coupled at one end 12 to the gear selection lever 13 of a road vehicle. At its opposite end 14 the link member 11 is arranged to be coupled to the gearbox 15 of the vehicle. The link member 11 is capable of acting as a solid rod, and when so acting, the link member 11 is capable of transmitting movements of the levers 13 to the gearbox 15 to operate the gearbox. It will be appreciated, that the movements of the rod 11 in response to movements of the lever 13 will be both axial movements and angular movements where the gearbox is of the conventional, manually operated type having four forward gears and one reverse gear. The lever 13 is pivotally connected to the link member 11 for movement about a first axis, and the lever 13 is also pivotally coupled to the body 16 of the vehicle for movement about a parallel axis. The engagement of the lever 13 with the body 16 of the vehicle permits the lever to be moved in a plane containing the pivotal axis of the connection of the lever to the body, so that the link member can be rotated, it being appreciated that when the lever 13 is moved about said pivotal axis with respect to the body 16, then the link member 11 is moved axially. At its end 14, the link member 11 is connected to the conventional gear selector arrangement of the gearbox 15, and operates the selector arrangement in known manner.

The link member 11 includes a first solid rod 17 coupled off 12 to the lever 13, and defining at its end remote from the lever 13 a hollow sleeve 18. Received within the sleeve 18 is a second solid rod 19, constituting a second part of the link member 11. The end of the rod 19 is slidable within the sleeve 18, and at its end 14 remote from the sleeve 18 the rod 19 is coupled to the gearbox 15. Surrounding the sleeve 18, and extending beyond the free end of the sleeve 18 to surround part of the rod 19 is a collar 21 which is secured to the body of the road vehicle, and so is fixed with respect to the link member 11, the link member 11 being slidable within the collar 21.

The collar 21 is provided with an aperture 22 into which a portion of the periphery of a cam 23 extends. The surface of the sleeve 18 is exposed to the periphery of the cam 23, through the aperture 22, and the portion of the sleeve 18 exposed through the aperture 22 is provided with a transverse bore 24 through which the surface of the rod 19 is exposed. The portion of the rod 19 within the sleeve 18 is formed with a part spherical recess 25 and a steel ball 26 extends from the aperture 22, through the bore 24 and into the recess 25, the diameter of the ball 26 being such that the ball 26 can be forced into engagement with the surface of the recess 25 by the periphery of the cam 23, when the recess 25, the bore 24, and the aperture 22 are aligned.

The periphery of the cam 23 includes a recessed region 27 so dimensioned that when the recessed region 27 is presented to the aperture 22, then the ball 26 can be displaced from the recess 25. The cam 23 is carried by the movable cylinder of a key operated lock arrangement 10. The key operated lock arrangement 20 includes a barrel which is fixed to the body of the vehicle, the barrel including an integral casing housing and supporting the cam 23. The cylinder of the lock can only be rotated relative to the barrel of the lock by an appropriate key, and so the cam 23 can only be rotated relative to the ball 26 by said key. The cylinder of the lock arrangement also drives the rotor of an electrical switch housed within the casing defined by the barrel of the lock. The rotor of the switch carries movable contacts which co-operate with fixed electrical contacts carried by the casing, and so the circuits controlled by the electrical switch are also only operable by the predetermined key. Where the vehicle in question is a vehicle having a petrol engine, then the electrical switch can be the switch which controls the ignition and starter circuits of the vehicle, and where the vehicle is a vehicle having a diesel engine, then the electrical switch can control the starter starting aid, and generator circuits of the vehicle.

When the cam 23 is rotated to a position wherein the recessed region 27 is presented to the ball 26, then movement of the gear selector lever 13 will cause movement of the rod 17, but since the ball 26 is not held in engagement with the recess 25, then the ball 26 can easily be displaced from the recess 25, and the sleeve 18, and of course the rod 17 will be capable of movement relative to the rod 19. Thus movements of the lever 13 will not be transmitted to the gearbox 15, and the gearbox 15 will remain in the previously selected condition irrespective of the movement of the lever 13. Preferably the recess 25, the bore 24 and the aperture 22 are so positioned relative to one another that they are aligned only in the neutral or reverse gear position of the gearbox, and so when the recessed portion of the cam 23 is presented to the ball 26 the gearbox 15 will remain in its neutral or reverse gear condition regardless of the movements of the lever 13. Conveniently, the angular position of the cam 23 where the recess 27 is presented to the ball 26 corresponds to an off position of the electrical switch associated with the cam 23.

When the lever 13 is returned to a position wherein the recess 25, the bore 24, and the aperture 22 are all aligned, then the cam 23 can be rotated to a position where the ball 26 is forced into engagement with the surface of the recess 25, so that the sleeve 18 and the rod 19 are locked together by the ball 26. Thus when the ball is urged into engagement with the surface of the recess 25, the link member 11 becomes effectively a solid rod and is capable of transmitting the movements of the lever 13 to the gearbox 15. It will be noted, that when the link member is moved by the lever 13, then the ball 26, which of course moves with the sleeve 18, will be disengaged from the periphery of the cam 23. However, the ball 26 cannot become disengaged from the recess 25, since immediately the ball 26 disengages from the periphery of the cam 23, it is engaged by the collar 21 at one side or other of the aperture 22.

The cam 23 can be of any convenient form, for example, face side, or tapered. Moreover the recess 24 can if desired be replaced by a conical recess, or a part circumferential groove in which later case of course there will be limited freedom of angular movement between the sleeve 18 and rod 19 when they are interconnected by the ball 26.

It will be appreciated, that the above described arrangement minimises the risk of the vehicle being driven away by an unauthorised person, unless that person possesses the appropriate key. It will be noted that if the unauthorised person manages to start the engine of the vehicle by for example short circuiting the electrical switch associated with the cam 23, then he still cannot drive the vehicle away, since the gearbox will remain in its neutral condition regardless of the movements of the lever 13.

I claim:
1. A gear selection mechanism for a vehicle, the mechanism including a link member, means at one end of the link member whereby the link member can be coupled, in use, to a gear selector lever of a vehicle, further means at the opposite end of the link member whereby the link member can be coupled, in use, to the gear box of the vehicle in such a manner that the link member will transmit movements of the gear selector lever to the gear box to operate the gear box, the link member comprising first and second parts capable of movement relative to one another and the mechanism further including a locking unit selectively operable either to interconnect the first and second parts so that the link member is capable of transmitting said movement, or to release the first and second parts for relative movement so that the link member cannot transmit the movement of the gear selector lever to the gear box, the locking unit being manually operable, and including a key-operated arrangement whereby the unit can only be operated by a predetermined key.

2. A mechanism as claimed in claim 1 wherein the locking unit is manually operable from within the driving compartment of the vehicle.

3. A mechanism as claimed in claim 1 wherein the key operated arrangement includes an electrical switch which is also operable only by said key and which controls starting of an engine of the vehicle.

4. A mechanism as claimed in claim 3 wherein said switch is an ignition control switch.

5. A mechanism as claimed in claim 1 wherein the locking unit includes a locking member, preferably a ball, which is urged by a rotatable cam to a position wherein it extends through an aperture in a sleeve integral with said first part of the link member, into engagement with the wall of a recess in a portion of the second part of the link member which is slidably received in said sleeve, to lock the first part to the second part, the cam having a recessed region which when aligned with said locking member permits the locking member to become disengaged from the recess in the second part so that the first and second parts are released for relative movement.

* * * * *